Sept. 11, 1951 E. TOTH 2,567,255

HIGH-FREQUENCY VACUUM TUBE

Filed Feb. 20, 1946

Inventor
EMERICK TOTH

By M. O. Hayes

Attorney

Patented Sept. 11, 1951 2,567,255

UNITED STATES PATENT OFFICE 2,567,255

HIGH-FREQUENCY VACUUM TUBE

Emerick Toth, Potomac Park, Md.

Application February 20, 1946, Serial No. 649,101

6 Claims. (Cl. 313—252)

(Granted under the act of March 3, 1883, as amended April 30, 1928; 370 O. G. 757)

This invention relates in general to a vacuum tube structure, and in particular to a novel high frequency thermionic vacuum tube structure.

One requirement for the satisfactory operation of a vacuum tube at high frequencies is that the reactive properties of the tube be kept at an absolute minimum. These reactive properties include fortuitous capacities and inductances associated with the electrode supports and leads as well as those associated with the electrodes themselves.

Efforts previously made to obtain a vacuum tube suitable for operation at high frequencies have, in general, resulted in tubes of small dimensions with elements of small dimensions. However, the leads to the elements have considerable capacitance and inductance and the overall capacitance and inductance is still objectionable. In addition to tubes of more conventional design there have been developed a few tubes with planar elements of the disc seal type. The term planar as applied to elements of vacuum tubes is well known to the art, but for purposes of clarity will be defined as it is used in reference to this invention: A planar element is one of which the part or parts which cause the element to perform the principal function characteristic of it lie substantially all in one plane. The disc seal, planar element type is well suited for use with cavity resonated tuning circuits, but not well suited for use with tuning circuits composed of lumped constants. Such a tube when used with cavity resonated tuning circuits is difficult to install and remove, and together with its tuning circuit occupies considerable space. Also, in this type the spacing of the elements is determined only by the glass which is sealed to the disks supporting the elements.

An object of this invention is to provide a vacuum tube suitable for use at high frequencies.

Another object of this invention is to provide a vacuum tube having very low capacitance between elements including leads, and having very low inductance of leads to the elements.

Another object is to provide a vacuum tube suitable at high frequencies for use with lumped constant tuning circuits.

Another object is to provide a vacuum tube which may be readily inserted in and withdrawn from, a suitable receptacle.

Another object is to provide a vacuum tube that is very small in size and yet sturdy.

Other objects and features of the present invention may be obtained from the following detailed description when taken together with the accompanying drawing; in which Figure 1 is a simplified side view, partly in cross section, of one embodiment of this invention.

Figure 1:
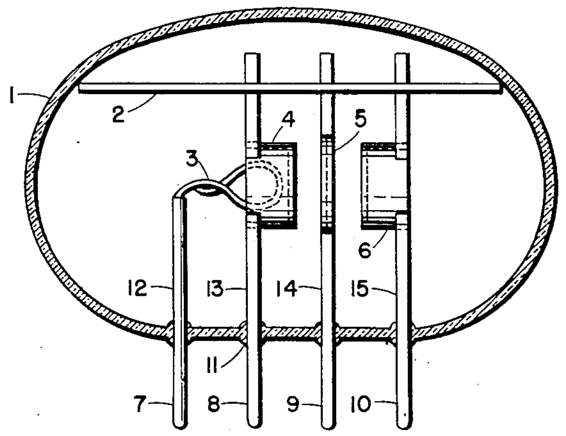
Figures 2, 3:
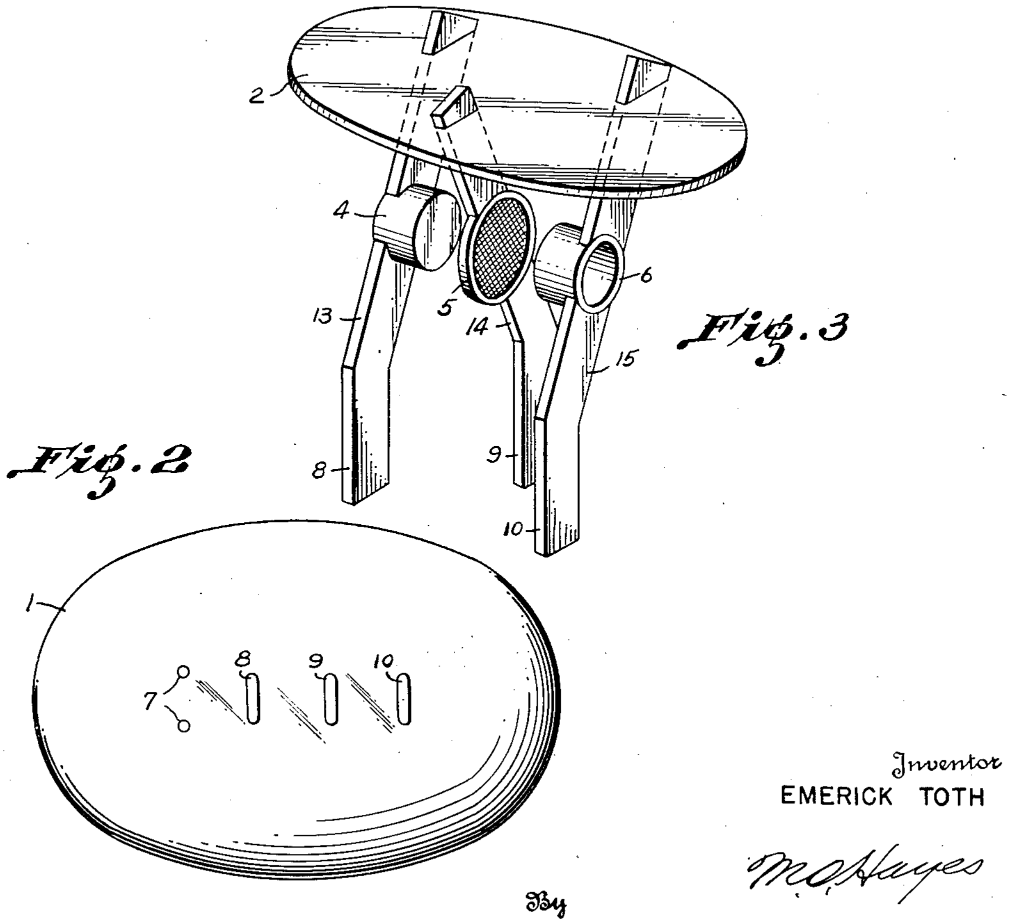
Figure 2 is a bottom view of the embodiment shown in Figure 1.
Figure 3 is an isometric drawing of a variant embodiment of the invention.

The structure shown in Figures 1 and 2, to which reference is now made, includes: a cathode electrode 4 and supporting member 13, a grid electrode 5 and supporting member 14, an anode electrode 6 and supporting member 15, and a suitable envelope 1. The envelope is preferably made from an insulating material, such as glass, and is evacuated so as to provide a gas tight chamber for the electrodes.

The electrodes, 4, 5, and 6, and a major portion of each of the supporting members, 13, 14, and 15, are enclosed within the envelope 1. The supporting members are made of a suitable conducting material and are essentially rectangular in cross-section, as indicated more clearly in Figure 2, so as to reduce their self-inductance. The upper extremities of the supporting members are rigidly held by an insulating disc 2, such as mica, located at the top of the envelope 1. The lower extremities of the electrode supporting members extend downwardly in mutual parallelism through the glass envelope to form suitable terminal prongs 8, 9, and 10.

The electrodes, 4, 5, and 6 are securely fixed to their respective supporting members 13, 14, and 15 such as by welding so as to provide a good mechanical and electrical connection therebetween. The cathode and anode electrodes 4 and 6 respectively are generally cylindrical in shape and are provided with opposing end surfaces. The cathode is coated with a suitable electron emitting material and is heated by a filament 3 which is supported by a pair of rod-like conducting members 12. The filament supporting members 12 like the other electrode supporting members extend downwardly through the envelope of the tube so as to form a pair of filament terminal prongs 7. The grid electrode 5 is a generally disc shaped screen, as more clearly illustrated in Figure 3, inserted in axial alignment with and interposed between the cathode and anode electrodes.

To facilitate a metal to glass seal between the tube terminals and the glass envelope 1, the edges of the supporting members may be rounded as indicated in Figure 2. Additionally at the point of seal 11 the supporting members may include a small section of metal which has a coefficient of expansion approaching that of glass.

In some instances it may be desired to support the elements 4, 5, 6, of Figure 1 by supports which are not parallel throughout their length, or are not all vertical, or do not all pass through the glass envelope 1 in the same direction, or that are extended in more than one direction to pass through the envelope 1 in more than one place. Any such variation may be for the purpose of further reducing capacitance and inductance of the supports and extensions of the supports.

Referring to Figure 3, which illustrates a variant embodiment of the invention minus the glass envelope, the supports 13, 14, and 15 of the elements 4, 5, 6, extend downwardly and laterally from the axis of the electrodes so that the supports project from the tube envelope on alternate sides of the vertical axial plane of the tube. By so disposing the supports the area of any support projected on to adjacent supports is reduced to a minimum which thereby reduces the intra-support capacitance to a minimum.

As indicated in Figure 3, the supporting members 13, 14, and 15 are again essentially rectangular in cross section and are respectively integral with the prongs 8, 9, and 10 so that any prong is an extension of its respective supporting member and vice versa. In other words, each element has one and only one supporting member or device, which is extended smoothly to become the external prong for that element.

A number of variations of design are possible. It may be desired to extend one or more supports of the elements 4, 5, 6, of Figure 1 through the glass envelope at the top of the tube. Notwithstanding such modification the tube may be inserted from one direction into a receptacle. In this case, however, the direction would be into the paper instead of towards the bottom of the paper as is the case of the embodiment in Figure 1.

The supports 13, 14, and 15 for any number of the elements 4, 5, 6 may be extended in both directions and thus result in two prongs 8, 9, 10 for each element with supporting members so extended. The envelope 1 may be in any of several forms. It may be all glass as in Figure 1 or it may be partly metal.

Although I have shown and described only limited and specific embodiments of the present invention it is to be understood that I am fully aware of the many modifications possible thereof. For example, tubes other than triodes can be readily constructed according to the teaching of this invention. Therefore, this invention is not to be limited except insofar as is necessitated by the spirit of the art and the scope of the appended claims.

The invention described herein may be manufactured and used by or for the Government of the United States of America for government purposes without the payment of any royalty thereon or therefor.

I claim as my invention:

1. A vacuum tube structure comprising cathode, anode and grid planar electrodes, said cathode and anode electrodes being generally cylindrical in shape and having end surfaces facing each other, said grid electrode being generally a disc-shaped screen which is interposed between said cathode and anode electrodes in axial alignment therewith, separate supporting members for each of said electrodes being generally rectangular in cross section and extending downward and laterally from the central axis of said electrodes at angles inclined to the vertical, said angles being in planes perpendicular to said axis and alternately in opposite direction, the area of any support projected onto adjacent supports being a minimum, an evacuated envelope surrounding said electrodes and part of said supporting members, said supporting members being sealed to and extending beyond said envelope and providing the sole means of external electrical contact with said electrodes.

2. In a vacuum tube having a plurality of parallel planar electrodes spatially arranged along a common axis within an evacuated envelope, a columnar supporting member for each of said electrodes, means securing each of said columnar supporting members to said envelope intermediate the length of said columnar supporting member, one end of each of said supporting members protruding externally of said envelope, means securing the other end of each of said columnar supporting members to its respective electrode, said columnar supporting members being disposed in angularly divergent relationship in spaced apart planes perpendicular to said electrode common axis, whereby the area of any supporting member projected in the direction of said common axis onto adjacent supporting members is a minimum, and whereby the exclusive electrically conducting path for energy to each of said electrodes is through its respective columnar supporting members.

3. In a vacuum tube having a plurality of parallel disc-shaped electrodes coaxially spaced apart along a central axis within an evacuated envelope, a columnar supporting member for each of said electrodes, each of said columnar supporting members having a generally rectangular cross section to provide a relatively large surface area for a given cross-sectional area and thereby reduce the self inductance of said columnar supporting member, means securing each of said columnar supporting members to said envelope intermediate the length of said columnar supporting member, one end of each of said supporting members protruding externally of said envelope, and means securing each of said columnar supporting members to its respective electrode adjacent its other end, whereby the exclusive electrically conducting path for energy to its respective electrode is through said columnar supporting member, said columnar supporting members being disposed in angularly divergent relationship perpendicular to said electrode common axis, whereby the area of any supporting member projected in the direction of said common electrode axis onto adjacent supporting members is a minimum, thereby reducing capacitance between adjacent supporting members to a minimum.

4. In a vacuum tube having a plurality of parallel disc-shaped electrodes coaxially spaced apart along a central axis within an evacuated envelope, a columnar combination conducting lead and supporting member for each of said electrodes, each of said columnar supporting members having a generally rectangular cross section to provide a relatively large surface area for a given cross-sectional area and thereby reduce the self inductance of said columnar supporting members, means securing each of said columnar supporting members intermediate its length to its respective electrode, means securing insulated spacer means intermediate one end of said respective supporting members for maintaining said ends in defined spaced apart relation, the other ends of said supporting members projecting externally of said envelope, and means securing said supporting members in spaced apart relation to said envelope adjacent said other ends, said columnar supporting members being disposed in angularly divergent relationship perpendicular to said electrode common axis, whereby the area of any supporting member projected in the direction of said common electrode axis onto adjacent supporting members is a minimum, thereby reducing capacitance between adjacent supporting members to a minimum.

5. Electron discharge device structure comprising an evacuated envelope, a plurality of electrically conducting spaced apart supporting members, each of said supporting members being generally rectangular and having a length dimension greater than its other dimensions, means securing each supporting member to said envelope intermediate the length of said supporting member with one end of said supporting member protruding externally of said envelope and said supporting members being disposed in parallel planes with said envelope, a plurality of electrodes within said envelope, means securing each of said electrodes to a respective supporting member intermediate said envelope and the other end of said supporting member and in superimposed relation with coaxially aligned portions of said respective supporting members and means securing insulated spacer means intermediate said other ends of said supporting members.

6. Electron discharge device structure comprising an evacuated envelope, a plurality of electrically conducting spaced apart supporting members, each of said supporting members being generally rectangular and having a length dimension greater than its other dimensions, means securing each supporting member to said envelope intermediate the length of said supporting member with one end of said supporting member protruding externally of said envelope, a plurality of parallel planar electrodes spatially arranged along a common axis within said envelope, means securing each of said electrodes to a respective supporting member adjacent the other end of said supporting member, said supporting members being disposed in parallel planes within said envelope, and adjacent supporting members disposed in angularly divergent relationship about said electrode common axis in said parallel planes.

EMERICK TOTH.

REFERENCES CITED

The following references are of record in the file of this patent:

UNITED STATES PATENTS

| Number | Name | Date |
|---|---|---|
| 2,330,838 | Nelson | Oct. 5, 1943 |
| 2,391,927 | Segerstrom, Jr. | Jan. 1, 1946 |
| 2,504,494 | Bull | Apr. 18, 1950 |

FOREIGN PATENTS

| Number | Country | Date |
|---|---|---|
| 458,702 | Great Britain | Dec. 24, 1936 |